(12) United States Patent
Ulrich et al.

(10) Patent No.: US 7,318,324 B2
(45) Date of Patent: Jan. 15, 2008

(54) COMBINED PARTICULATE AND CONVENTIONAL ICE CREAM

(76) Inventors: Connie D. Ulrich, 188 Mimosa La., Paducah, KY (US) 42001; Tom Timmons, 320 Pinebrook Dr., Paducah, KY (US) 42001

( * ) Notice: Subject to any disclaimer, the term of this patent is extended or adjusted under 35 U.S.C. 154(b) by 701 days.

(21) Appl. No.: 10/872,835

(22) Filed: Jun. 21, 2004

(65) Prior Publication Data

US 2006/0102016 A1 May 18, 2006

(51) Int. Cl.
*A47J 27/00* (2006.01)
*A23L 1/00* (2006.01)

(52) U.S. Cl. .................. 62/342; 99/455; 366/144

(58) Field of Classification Search .......... 99/452–455, 99/460, 450.1–450.8; 62/342–343; 366/144–149
See application file for complete search history.

(56) References Cited

U.S. PATENT DOCUMENTS

| | | |
|---|---|---|
| 3,360,384 A | 12/1967 | Kurzinski |
| 4,031,262 A | 6/1977 | Nakayama et al. |
| 4,310,559 A | 1/1982 | Mita et al. |
| 4,353,927 A | 10/1982 | Lovercheck |
| 4,655,047 A | 4/1987 | Temple |
| 4,687,672 A | 8/1987 | Vitkovsky |
| 5,126,156 A | 6/1992 | Jones |
| 5,219,455 A | 6/1993 | Trucco |
| 5,232,027 A | 8/1993 | Tanaka et al. |
| 5,307,640 A | 5/1994 | Fawzy |
| 5,378,483 A | 1/1995 | Fazio et al. |
| 5,403,611 A | 4/1995 | Tomita et al. |
| 5,464,119 A | 11/1995 | Giuseppe et al. |
| 5,620,732 A | 4/1997 | Clemmings et al. |
| 5,714,043 A | 2/1998 | Finley et al. |
| 5,948,456 A | 9/1999 | Jones et al. |
| 5,958,493 A | 9/1999 | Grigoli |
| 6,000,229 A | 12/1999 | Jones |
| 6,060,099 A | 5/2000 | Ito |
| 6,089,747 A | 7/2000 | Huang |
| 6,103,287 A | 8/2000 | Soehnlen et al. |
| 6,145,701 A | 11/2000 | Van Der Merwe et al. |
| 6,209,329 B1 | 4/2001 | Jones |
| 6,209,590 B1 | 4/2001 | Mandsberg |
| 6,223,542 B1 | 5/2001 | Jones |
| 6,250,794 B1 | 6/2001 | Huang |
| 6,267,049 B1 | 7/2001 | Silvano |
| 6,318,889 B1 | 11/2001 | Hansen, Sr. |
| 6,355,290 B1 | 3/2002 | Soehnlen et al. |
| 6,494,049 B1 | 12/2002 | Jones |
| 6,539,743 B2 | 4/2003 | Jones |

FOREIGN PATENT DOCUMENTS

CA 964921 3/1975

*Primary Examiner*—William E. Tapolcai
(74) *Attorney, Agent, or Firm*—Stockwell & Smedley, PSC

(57) ABSTRACT

An apparatus and method for combining particulate and traditional conventional ice cream is disclosed.

25 Claims, 7 Drawing Sheets

COMBINED PARTICULATE AND CONVENTIONAL ICE CREAM

FIELD OF THE INVENTION

The present invention relates to ice cream and more particularly to an apparatus and method for combining particulate and traditional conventional ice cream.

BACKGROUND OF THE INVENTION

Conventional ice cream has existed for many years in many embodiments. Particulate ice cream is newer and not as ubiquitous in the marketplace. However, attempts to combine the two have been rare because the process of making conventional ice cream differs substantially from making particulate ice cream. Consequently, a method and apparatus for combining the two entities is desired.

SUMMARY OF THE INVENTION

It is an object of the present invention to provide an apparatus for manufacturing combined conventional and particulate ice cream, comprising a cryogenic processor, for use in producing particulate ice cream beads; a mechanism for producing conventional ice cream; and a blending means. It is another object of the present invention to provide a variable speed fruit and nut feeder, for managing and measurably dispersing the beads at a suitable rate for combination with the conventional ice cream, and a stuffing pump, for combining the beads with the conventional ice cream.

It is another object of the present invention to employ the above apparati to mold the blended ice cream onto a stick and then dip it into chocolate or fudge after molding, and potentially dip that combination into nuts. It is another object of the present invention to have the blended ice cream be of a fruity consistency and dipped into a coating adaptable with fruit.

It is yet another object of the present invention to mold a blended product onto a rounded rather than flat stick, wherein the blended product can be pushed up through the container by a consumer. It is another objection of the present invention to have the blended ice cream mix encased in an ice cream sandwich structure. It is another object of the present invention to have a layer of blended ice cream mix is positioned between two layers of cake slabs and then pressed and frozen together.

These and other objects of the invention will become readily apparent as the following description is read in conjunction with the accompanying drawings.

DETAILED DESCRIPTION OF THE PREFERRED EMBODIMENTS

Before explaining the disclosed embodiment of the present invention in detail it is to be understood that the invention is not limited in its application to the details of the particular arrangement shown, since the invention is capable of other embodiments. Also, the terminology used herein is for the purpose of description and not of limitation.

Figure 1:
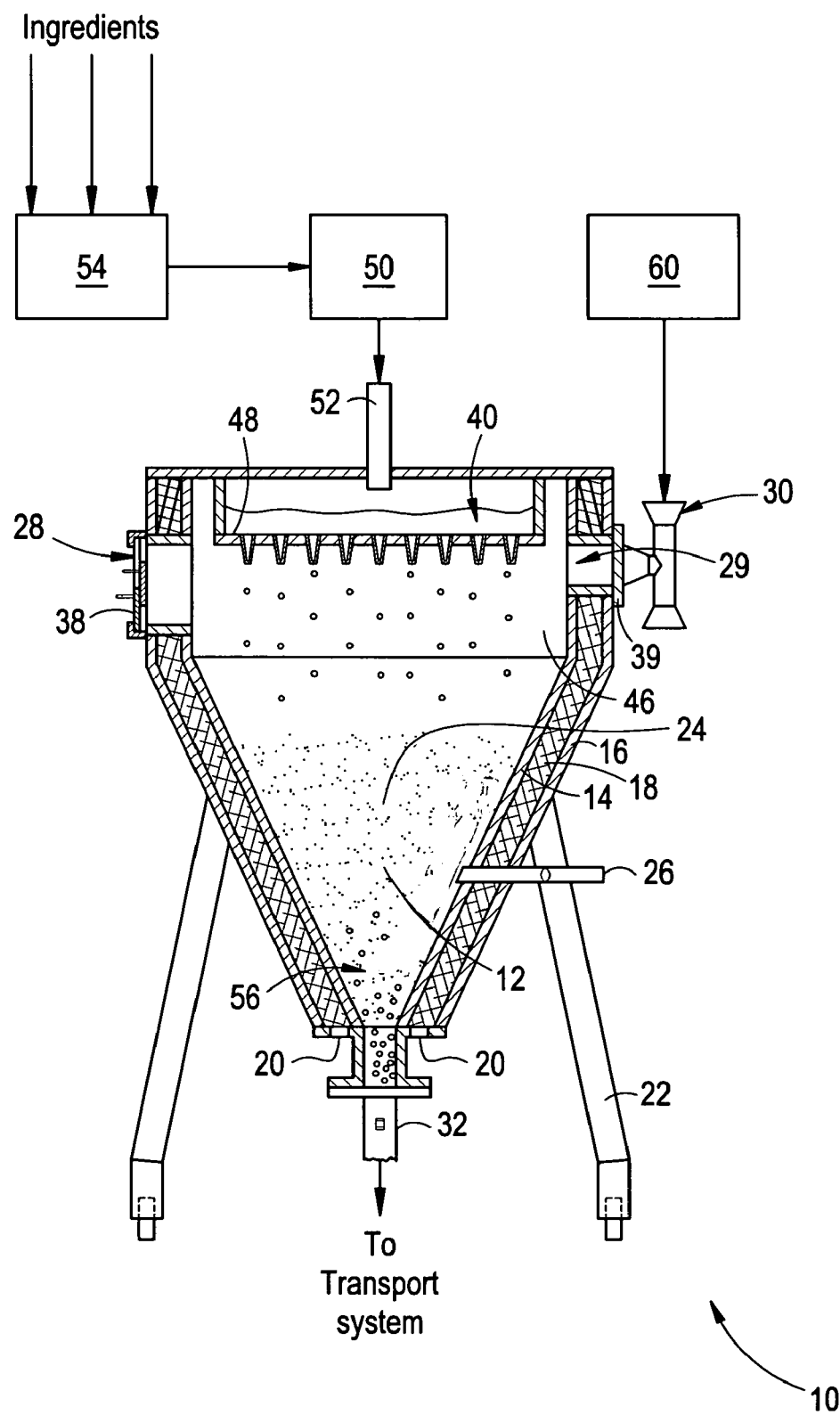
FIG. 1 shows a portion of the present invention.

FIG. 1 shows a cryogenic processor constructed in accordance with the preferred embodiment of the present invention to produce free-flowing beads 56. The fundamental method utilized to produce the product is described in detail in U.S. Pat. No. 5,126,156, which is hereby incorporated by reference.

A cryogenic processor 10 includes a freezing chamber 12 that is most preferably in the form of a conical tank that holds a liquid refrigerant therein. A freezing chamber 12 incorporates an inner shell 14 and an outer shell 16. Insulation 18 is disposed between the inner shell 14 and outer shell 16 in order to increase the thermal efficiency of the chamber 12. Vents 20 are also provided to ventilate the insulated area formed between the shells 14 and 16. The freezing chamber 12 is a free-standing unit supported by legs 22.

A refrigerant 24, preferably liquid nitrogen, enters the freezing chamber 12 by means of refrigerant inlet 26. The refrigerant 24 is introduced into a chamber 12 through the inlet 26 in order to maintain a predetermined level of liquid refrigerant in the freezing chamber because some refrigerant 24 can be lost by evaporation or by other means incidental to production. Gaseous refrigerant that has evaporated from the surface of the liquid refrigerant 24 in freezing chamber 12 primarily vents to the atmosphere through exit port 29 which cooperates with the vacuum assembly 30, which can be in the form of a venturi nozzle. Extraction of the frozen beads occurs through product outlet 32 adapted at the base of the freezing chamber 12.

An ambient air inlet port 28 with adjustment doors 38 and exit port 29 with adjustment doors 39 are provided to adjust the level of gaseous refrigerant which evaporates from the surface of the liquid refrigerant 24 so that excessive pressure is not built up within the processor 10 and freezing of the liquid composition in the feed assembly 40 does not occur.

A feed tray 48 receives liquid composition from a delivery source 50. Typically, a pump (not shown) drives the liquid composition through a delivery tube 52 into the feed tray 48. A premixing device 54 allows several compositions, not all of which must be liquid, such as powdered flavorings or other additives of a size small enough not to cause clogging in the feed assembly 40, to be mixed in predetermined concentrations for delivery to the feed tray 48.

In order to create uniformly sized particles or beads 56 of frozen product, uniformly sized droplets 58 of liquid composition are required to be fed through gas diffusion chamber 46 to freezing chamber 12. The feed tray 48 is designed with feed assembly 40 that forms droplets 58 of the desired character. The frozen product takes the form of beads that are formed when the droplets 58 of liquid composition contact the refrigerant vapor in the gas diffusion chamber 46, and subsequently the liquid refrigerant 24 in the freezing chamber 12. After the beads 56 are formed, they fall or are mechanically directed to the bottom of chamber 12. A transport system connects to the bottom of chamber 12 at outlet 32 to carry the beads 56 to a packaging and distribution network for later delivery and consumption.

The vacuum assembly 30 cooperates with air inlet 28 and adjustment doors 38 so that ambient air flows through the inlet and around feed assembly 40 to ensure that no liquid composition freezes therein. This is accomplished by mounting the vacuum assembly 30 and air inlet 28 on opposing sides of the gas diffusion chamber 46 such that the incoming ambient air drawn by the vacuum assembly 30 is aligned with the feed assembly. In this configuration, ambient air flows around the feed assembly warming it to a sufficient temperature to inhibit the formation of frozen liquid composition in the feed assembly flow channels. An air source 60, typically in the form of an air compressor, is attached to vacuum assembly 30 to provide appropriate suction to create the ambient air flow required.

It has been long established practice that when making traditional conventional ice cream, the ice cream must be held in a freezing cold "hardening cabinet" for 2, 4, or maybe 8 hours prior to shipping or delivery. However, because the beads 56 of the present invention are frozen at substantially lower temperatures than conventional ice cream, the interspersing of the ultra-cold beads within the conventional negates or greatly reduces this requirement.

Figure 2:
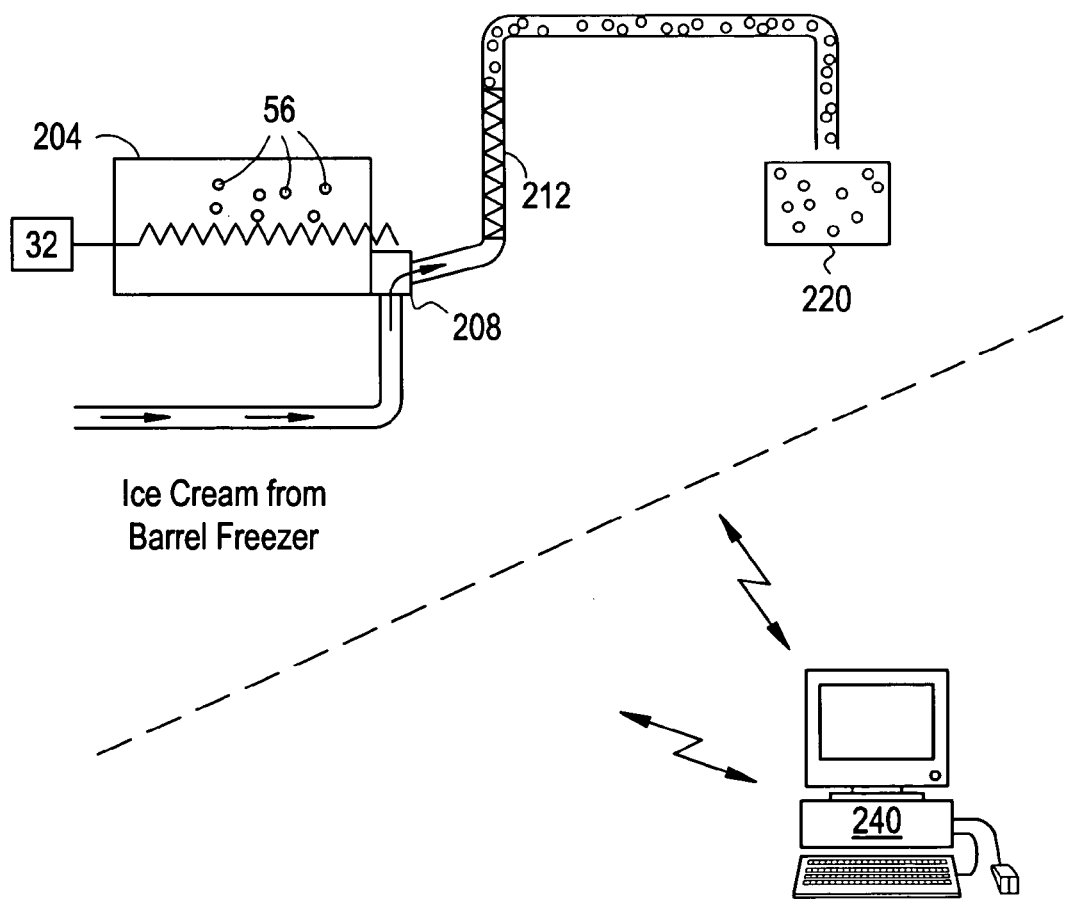
FIG. 2 shows a first embodiment of the present invention.

FIG. 2 shows an exemplary apparatus for blending particulate and conventional ice cream into a blended mix. In FIG. 2, the beads 56 are fed into a variable speed fruit and/or nut feeder 204 either directly from the outlet 32 or from a transport mechanism. In either case, the beads 56 are combined with the semi-frozen soft ice cream from a barrel freezer (not shown) by a stuffing pump 208, which forces the combination through a static mixer 212 where it is blended and then output into a container 220 either for consumption, shipping, or a hardening cabinet. The container can be either a bowl, a pint cup, or quart container, or perhaps some other type of vessel.

The stuffing pump ensures that a pre-configurable percentage of beads 56 are inserted into the semi-frozen soft ice cream, yet regulates the pressure and flow such that the beads 56 are not crushed. In an exemplary embodiment, the stuffing pump 208 feeds back information to a central control device 240 which can automatically make real-time adjustments to both the variable speed fruit and nut feeder 204 as well as a mechanism which controls the flow of semi-liquid conventional from the barrel freezer. An operator may also use the central control device 240 to make manual adjustments.

As shown in FIG. 2, the central control device 240 may be located at a standard room temperature environment separate from the food-preparation environment, and information communicated thereto could be wirelessly or remotely transmitted to the stuffing pump 208 and other mechanisms via communication means such as but not limited to WiFi or Bluetooth.

Figure 3:
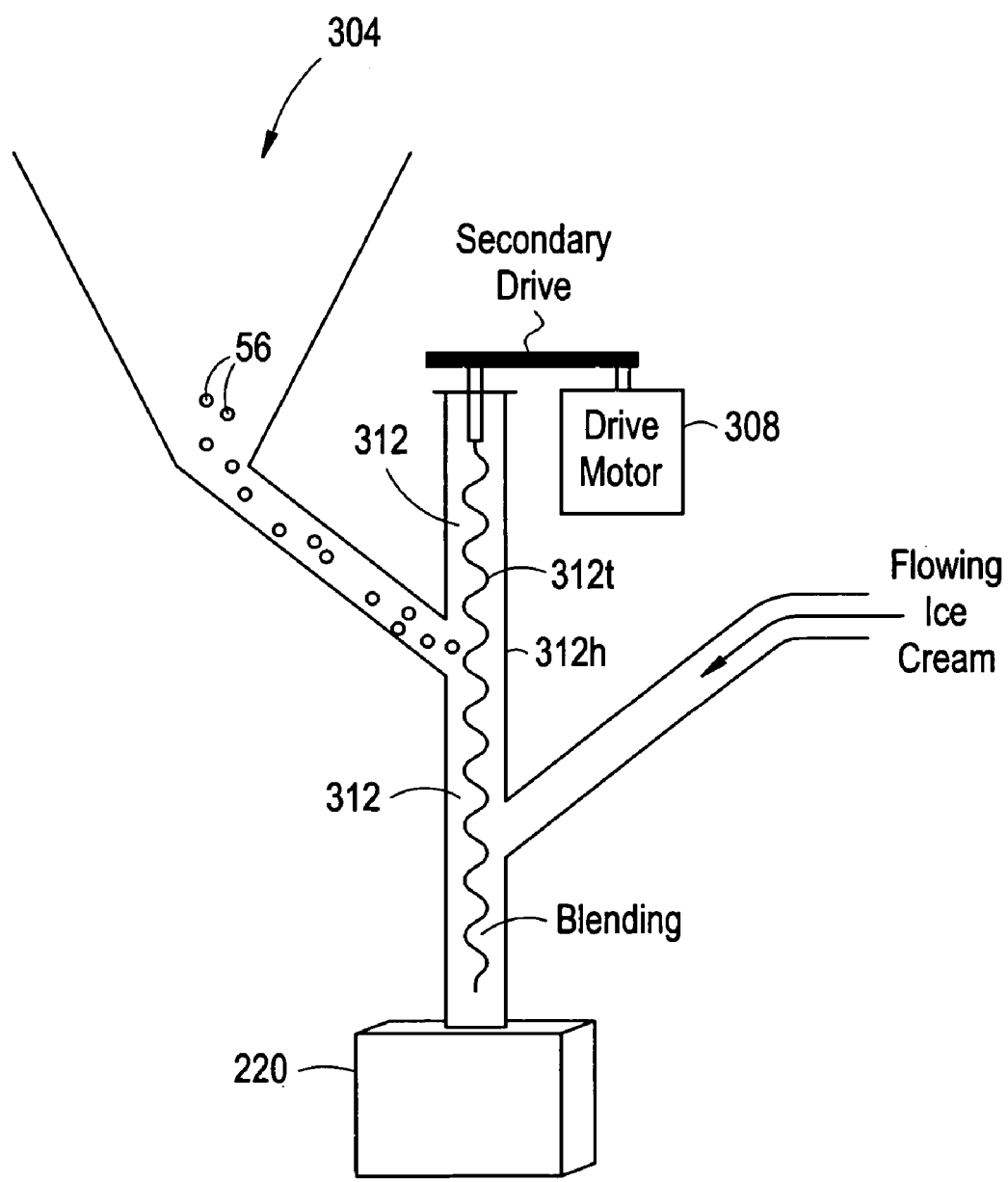
FIGS. 3, 4A, and 4B show a packaging mechanism used within the present invention.

FIG. 3 shows an alternative embodiment of the present invention in which the fruit and nut feeder 204 is not used, but instead the beads 56 are gravity fed into a mixing apparatus 312 powered by a drive motor 308. Using the mixing apparatus 312, a container 220 can be filled first with a layer of beads 56, then a layer of semi-frozen soft ice cream, then another layer of beads 56, and then a layer of something else, and so on. For conciseness, the mixing apparatus 312 is not drawn to scale. However, it is important to note that the distance between the threads 312t of the feed screw and the screw housing is small enough that the beads 56 only advance when the screw is rotating.

Figure 4A:
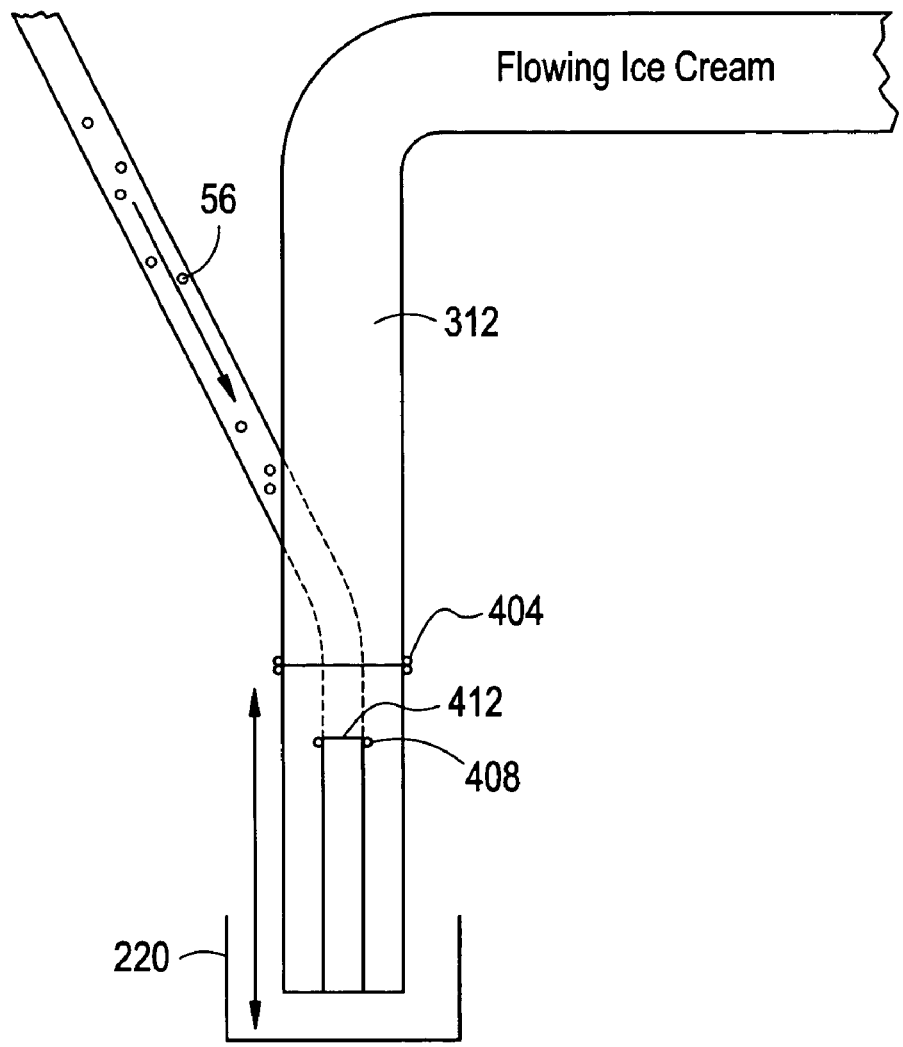
Figure 4B:
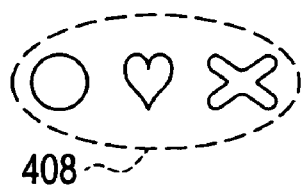

FIG. 4A shows a variation of the embodiment shown in FIG. 3, in which a twist-lock changeable pattern mechanism 408 is added to the mixing apparatus 312. The pattern mechanism 408 allows the inscribing of configurable patterns of beads 56 within the conventional ice cream. Various shapes including but not limited to those shown in FIG. 4B are possible, as well as letters, caricatures, and other artistic renderings in any shape, size, or form. Such a feature could be a useful marketing device around holidays such as Valentine's Day, Halloween, and Christmas.

The pattern mechanism 408 shown in FIG. 4B works as follows. The beads 56 are forced into a changeable pattern stencil 412 which starts out at the bottom of the empty container 220 and is raised at the same rate that the container 220 is filled. The rate at which the beads 56 and conventional ice cream are pumped into the pattern mechanism 408 and the container 220 must be are carefully monitored and controlled, potentially by a central control device 240, using information obtained from sensors within the pattern mechanism 408. Such control is needed in order to accurately reproduce the desired pattern throughout the entire container 220.

An additional alternative embodiment exists in which the beads 56 are swirled into the flowing ice cream by modifying the mixing apparatus 312 of FIG. 3. In this embodiment, the beads 56 are dropped into the container 220 which is simultaneously but separately being filled with conventional ice cream. Thus, the modified mixing apparatus contains two separate nozzles. The nozzle for the beads 56 can be adapted to rotate, zigzag, or move in a variety of directions so that the beads are swirled, spirally deposited, or linear deposited in some other type of recognizable pattern involving pre-arranged lines and curves.

Figure 5:
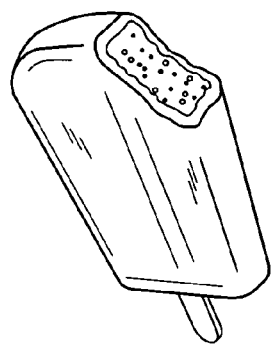
FIGS. 5-12 show exemplary products of the present invention.
Figure 6:
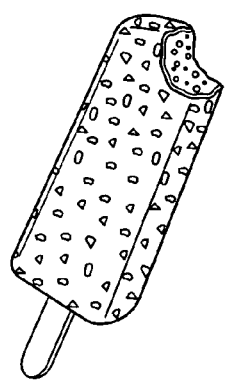
Figure 7:
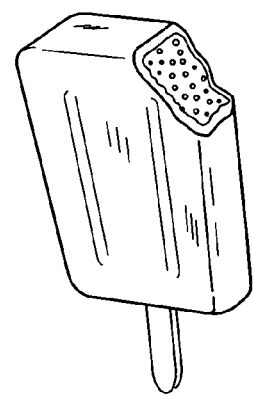

FIGS. 5-7 show various food items of the present invention produced by the above mechanisms attached to a stick, such as but not limited to an ice cream stick also referred to as a tongue depressor. The food items of FIGS. 5-7 are produced by a specially-shaped mold 220 (FIGS. 3, 4A) that is fitted to include the ice cream stick shown therein. The stick is inserted into the mold prior to deep-freezing, whether by barrel or otherwise, of the blended ice creams. The stick can have glow-in-the-dark properties, for novelty and packaging purposes. FIG. 5 shows the blended ice cream on a stick dipped into chocolate or fudge after molding. FIG. 6 shows the blended ice cream on a stick dipped into chocolate and then into nuts or some other suitable product after molding. FIG. 7 shows the blended ice cream being of a fruit consistency and then dipped into a some type of coating, including other than chocolate, which goes well with fruit. In FIGS. 5-7, it is to be noted that various toppings, coatings, inclusions, and variguts could be employed, and that the present invention should not be limited to the above suggestions only.

Figure 8:
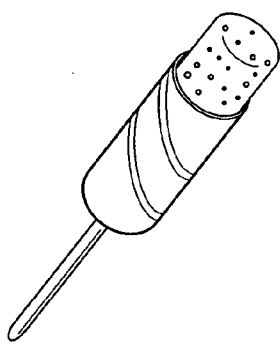

FIG. 8 is a push-up version of the present invention where the stick is rounded rather than flat. Also, the blended ice creams are shaped by the mold 220 into a cylindrical rather than rectangular shape, for packaging purposes.

Figure 9:
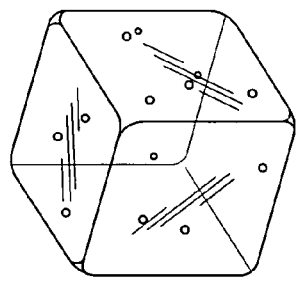
Figure 10:
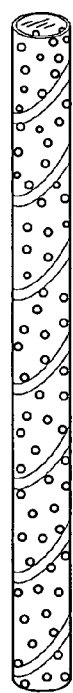

FIGS. 9-10 show embodiments of the present invention that do not involve conventional soft-serve ice cream at all. FIG. 9 locates several beads 56 inside of ice cubes. This combination is suitable for specialty beverages. Also, the ultra-cold nature of the beads 56 means less energy is required to freeze the ice cubes. FIG. 10 shows a series of beads 56 fixedly frozen inside a straw.

Figure 11:
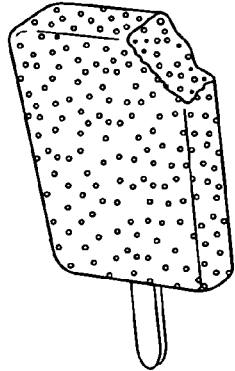
Figure 12:
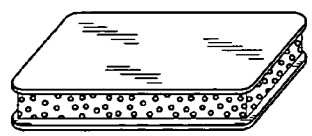

FIG. 11 shows the blended ice cream on a stick not dipped into anything, but instead frozen sufficiently solid by itself to be ready for immediate packaging and/or consumption. FIG. 12 shows the blended ice cream mix encased in an ice cream sandwich structure.

Figure 13A:
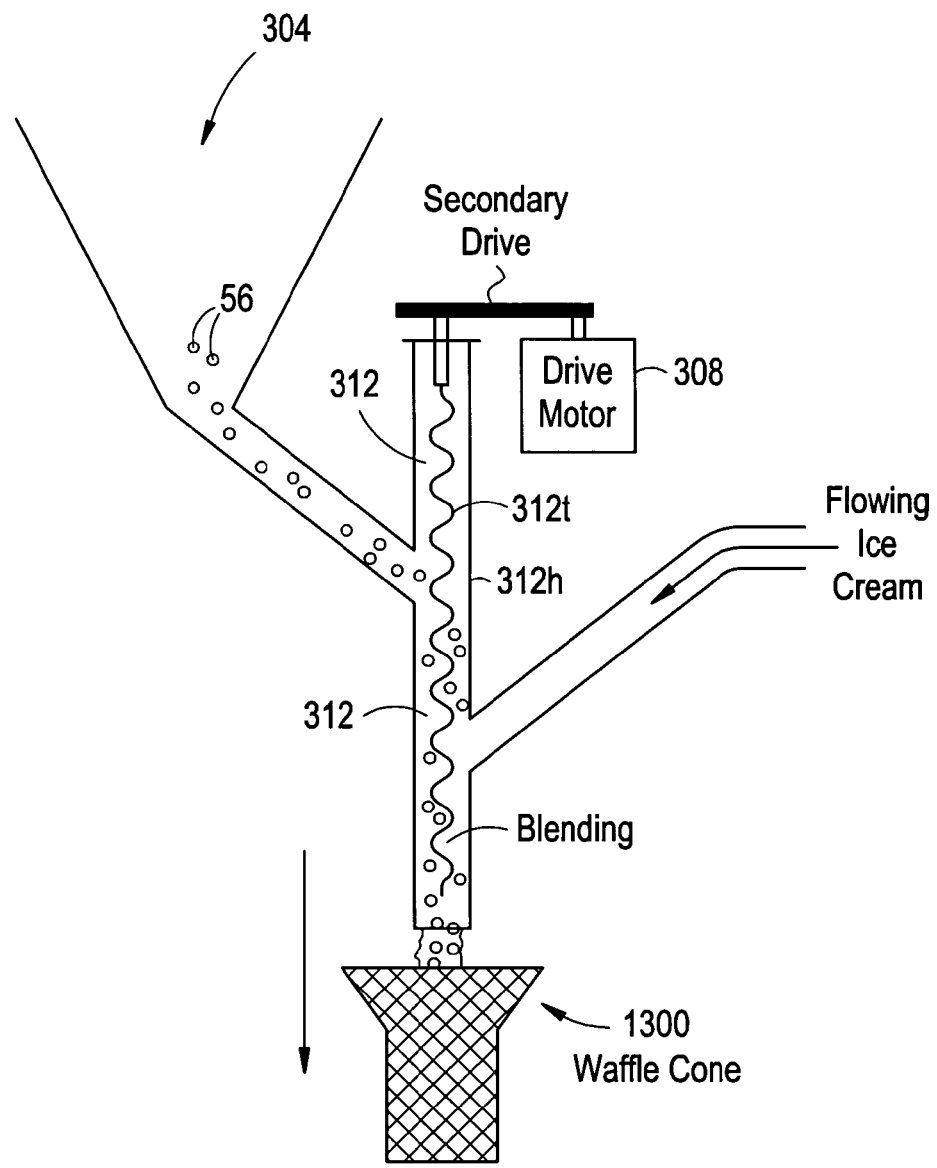
FIGS. 13A and 13B shows an alternative packaging mechanism within the present invention.
Figure 13B:
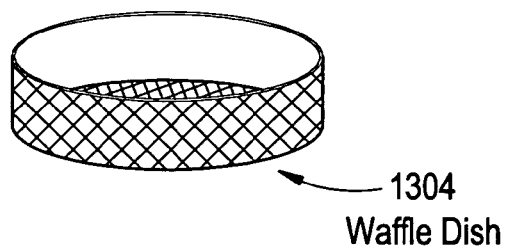

FIG. 13A shows the blending apparatus 312 delivering the combined mix not into the mold 220, but instead into an edible waffle cone 1300. FIG. 13B shows a variation of the waffle cone 1300 to be shaped more like an edible waffle dish 1304.

Figure 14:
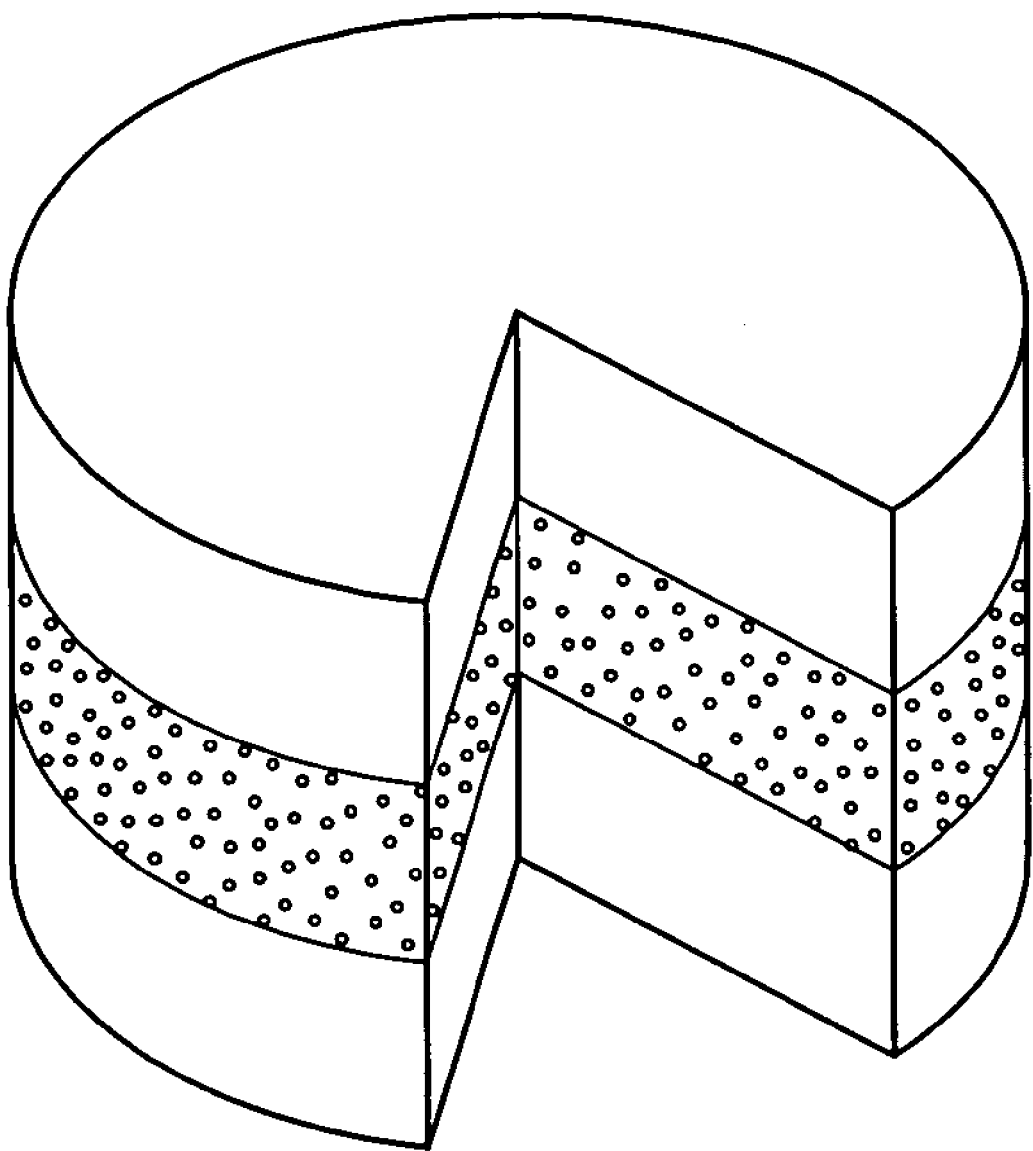
FIG. 14 shows an additional exemplary product of the present invention.

FIG. 14 shows an ice cream cake containing the blended ice cream mix of the present invention using the apparati of FIGS. 1-4. In FIG. 14, a layer of blended ice cream mix is positioned between two layers of cake slabs and then pressed and frozen together to form an ice cream cake.

The various aspects of the present invention has been described in detail with particular reference to preferred embodiments thereof, but it will be understood that variations and modifications can be effected within the spirit and scope of the invention as described herein. It is anticipated that various changes may be made in the arrangement and operation of the system of the present invention without departing from the spirit and scope of the invention, as defined by the following claims.

What is claimed is:

1. An apparatus for manufacturing combined conventional and particulate ice cream, comprising:
    a cryogenic processor, for use in producing particulate ice cream beads;
    a mechanism for producing conventional ice cream; and
    a blending means.

2. The apparatus of claim 1, wherein said blending apparatus further comprises:
    a variable speed fruit and nut feeder, for managing and measurably dispersing the beads at a suitable rate for combination with the conventional ice cream.

3. The apparatus of claim 2, wherein said blending apparatus further comprises:
    a stuffing pump, for combining the beads with the conventional ice cream.

4. The apparatus of claim 2, wherein said blending apparatus further comprises:
    a static mixer, for combining the beads with the conventional ice cream.

5. The apparatus of claim 1, further comprising.
    a container for holding the combined product, wherein the contained is made of a waffle product.

6. The apparatus of claim 1, further comprising:
    a mechanism which controls the flow of semi-liquid conventional from the barrel freezer.

7. The apparatus of claim 3, wherein the stuffing pump ensures that a pre-configurable percentage of beads are inserted into the semi-frozen soft ice cream, yet regulates the pressure and flow such that the beads are not crushed.

8. The apparatus of claim 7, wherein the stuffing pump feeds back information to a central control device which can automatically make real-time adjustments to the variable speed fruit and nut feeder.

9. The apparatus of claim 8, wherein the central control device is located at a standard room temperature environment separate from the food-preparation environment, and information communicated thereto could be wirelessly or remotely transmitted to the stuffing pump and other mechanisms via wireless communication.

10. The apparatus of claim 1, wherein said blending means further comprises:
    a mixing apparatus powered by a drive motor.

11. The apparatus of claim 1, wherein said blending means further comprises:
    a twist-lock changeable pattern mechanism.

12. The apparatus of claim 1, wherein said blending means further comprises:
    a changeable pattern stencil located at the bottom of an empty container and is raised at the same rate that a container is filled with combined ice cream.

13. The apparatus of claim 12, wherein the blending means contains two separate nozzles, one for conventional ice cream and one for particulate ice cream.

14. The apparatus of claim 13, wherein the particulate nozzle can rotate, zigzag, or move in a variety of directions.

15. The apparatus of claim 1, wherein the blended ice cream products have glow-in-the-dark properties.

16. The apparatus of claim 1, wherein the blended ice cream is molded onto a stick and then dipped into chocolate or fudge after molding.

17. The apparatus of claim 16, wherein the blended ice cream is dipped into nuts.

18. The apparatus of claim 17, wherein the blended ice cream has a fruity consistency and is dipped into a coating adaptable with fruit.

19. The apparatus of claim 16, wherein the stick is rounded rather than flat.

20. The apparatus of claim 19, wherein the blended product can be pushed up through the container by a consumer.

21. The apparatus of claim 16, wherein the blended ice creams are shaped by the mold into a cylindrical rather than rectangular shape, for packaging purposes.

22. The apparatus of claim 1, wherein a plurality of beads are located inside ice cubes.

23. The apparatus of claim 1, wherein a plurality of beads are fixedly frozen inside a straw.

24. The apparatus of claim 1, wherein the blended ice cream mix is encased in an ice cream sandwich structure.

25. The apparatus of claim 1, wherein a layer of blended ice cream mix is positioned between two layers of cake slabs and then pressed and frozen together.

* * * * *